United States Patent
Ke et al.

(10) Patent No.: US 11,200,269 B2
(45) Date of Patent: Dec. 14, 2021

(54) METHOD AND SYSTEM FOR HIGHLIGHTING ANSWER PHRASES

(71) Applicant: Microsoft Technology Licensing, LLC, Redmond, WA (US)

(72) Inventors: Qifa Ke, Cupertino, CA (US); Frank Torsten Bernd Seide, Yarrow Point, WA (US); Qi Liu, Santa Clara, CA (US); Rajanala Sai Krishna Sravanthi, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 714 days.

(21) Appl. No.: 15/624,459

(22) Filed: Jun. 15, 2017

(65) Prior Publication Data

US 2018/0365321 A1    Dec. 20, 2018

(51) Int. Cl.
*G06F 16/00*    (2019.01)
*G06F 16/338*    (2019.01)
(Continued)

(52) U.S. Cl.
CPC ........ *G06F 16/338* (2019.01); *G06F 16/3329* (2019.01); *G06F 16/3344* (2019.01); *G06F 16/3347* (2019.01); *G06F 40/103* (2020.01); *G06F 40/117* (2020.01); *G06F 40/216* (2020.01); *G06F 40/284* (2020.01);
(Continued)

(58) Field of Classification Search
CPC ...... G06F 16/338; G06F 40/30; G06F 40/103; G06F 40/117; G06F 40/216; G06F 40/284; G06F 16/3329; G06F 16/3344; G06F 16/3347; G06N 5/041; G06N 3/0445; G06N 3/0481; G06N 5/003; G06N 20/00; G06N 5/022; G06N 3/08; G06N 3/0454; G06N 3/0427
See application file for complete search history.

(56) References Cited

U.S. PATENT DOCUMENTS 6,269,368 B1 *  7/2001  Diamond ............ G06F 16/3329
8,533,130 B2     9/2013  Ershov
(Continued)

FOREIGN PATENT DOCUMENTS

CN    105740226 A    7/2016
WO    2015191652 A1    12/2015

OTHER PUBLICATIONS

Wang, et al., "Machine Comprehension Using Match-Lstm and Answer Pointer", In Journal of the Computing Research Repository, Aug. 2016, pp. 1-11.
(Continued)

*Primary Examiner* — Paul Kim

(57) ABSTRACT

Examples of the present disclosure describe systems and methods relating to generating relevance scores for one or more words of a passage which is an answer to a natural language query. For instance, a passage extracted from a highly relevant electronic file along with the query may encoded and augmented to generate a multi-dimensional, augmented semantic vectors using recurring neural networks. The augmented semantic vectors along with a multi-dimensional vector that represent words of the passage may be decoded to generate relevance scores for one or more words of the passage, based on levels of relevance to the query.

20 Claims, 12 Drawing Sheets

(51) Int. Cl.
  *G06N 3/04*      (2006.01)
  *G06F 16/332*    (2019.01)
  *G06F 16/33*     (2019.01)
  *G06N 5/04*      (2006.01)
  *G06F 40/30*     (2020.01)
  *G06F 40/103*    (2020.01)
  *G06F 40/117*    (2020.01)
  *G06F 40/216*    (2020.01)
  *G06F 40/284*    (2020.01)
  *G06N 5/00*      (2006.01)
  *G06N 20/00*     (2019.01)

(52) U.S. Cl.
  CPC .......... *G06F 40/30* (2020.01); *G06N 3/0445* (2013.01); *G06N 5/041* (2013.01); *G06N 3/0481* (2013.01); *G06N 5/003* (2013.01); *G06N 20/00* (2019.01)

(56) References Cited

U.S. PATENT DOCUMENTS

| | | |
|---|---|---|
| 2006/0224582 A1 | 10/2006 | Hogue |
| 2012/0150861 A1 | 6/2012 | Thione et al. |
| 2015/0169499 A1 | 6/2015 | Patel et al. |
| 2015/0254306 A1 | 9/2015 | Musuluri |
| 2016/0232440 A1 | 8/2016 | Gregor et al. |
| 2016/0358072 A1 | 12/2016 | Hermann et al. |
| 2016/0371254 A1* | 12/2016 | Yamagami .......... G06F 17/2795 |
| 2017/0193093 A1* | 7/2017 | Byron .................. G06F 40/205 |

OTHER PUBLICATIONS

Shi, et al., "Deep LSTM based Feature Mapping for Query Classification", In Proceedings of the Conference of the North American Chapter of the Association for Computational Linguistics: Human Language Technologies, Jun. 12, 2016, pp. 1501-1511.

Pennington, et al., "GloVe: Global Vectors for Word Representation", In Proceedings of the Conference on Empirical Methods in Natural Language Processing, Mar. 25, 2015, 77 pages.

Hochreiter, et al., "Long short-term memory", In Journal of neural Computation, vol. 9, Issue 8, Nov. 15, 1997, pp. 1735-1780.

Pascanu, et al., "How to construct deep recurrent neural networks", In Proceedings of the Computing Research Repository, Dec. 2013, 8 pages.

Silva, et al., "From symbolic to sub-symbolic information in question classification", In Journal Artificial Intelligence, vol. 35, Issue 2, Feb., 2011, pp. 1-20.

Socher, et al., "Semantic compositionality through recursive matrixvector spaces", In Proceedings of the 2012 Joint Conference on Empirical Methods in Natural Language Processing and Computational Natural Language Learning, Jul. 12, 2012, pp. 1201-1211.

Socher, et al., "Parsing with Compositional Vector Grammars", In Proceedings of the 51st Annual Meeting of the Association for Computational Linguistics, Aug. 4, 2013, 11 pages.

Socher, et al., "Recursive deep models for semantic compositionality over a sentiment treebank", In Proceedings of the conference on empirical methods in natural language processing, Oct. 18, 2013, 12 pages.

Sutskever, et al., "Sequence to sequence learning with neural networks", In Proceedings of the 27th International Conference on Neural Information Processing Systems, Dec. 8, 2014, pp. 1-9.

Sheng, et al., "Improved semantic representations from tree-structured long short-term memory networks", In Proceedings of the 53rd Annual Meeting of the Association for Computational Linguistics and the 7th International Joint Conference on Natural Language, Jul. 26, 2015, 11 pages.

Tang, et al., "Document modeling with gated recurrent neural network for sentiment classification", In Proceedings of the Conference on Empirical Methods in Natural Language Processing, Sep. 17, 2015, pp. 1422-1432.

"Microsoft Computational Network Toolkit (CNTK)", http://cntk.ai, Retrieved on: Feb. 16, 2017, 8 pages.

* cited by examiner

METHOD AND SYSTEM FOR HIGHLIGHTING ANSWER PHRASES

BACKGROUND

Question and answer systems have become widely available as there have been increasing needs to accurately search for information in relation to the vast amount of information accessible via the Internet. Various different question and answer systems exit, however, there is a need for a system capable of quickly conveying a correct answer to a user query.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for generating a relevance score to one or more words in a natural language answer passage for a natural language query. In an example, natural language queries may be answered with short passages. Such short passages may provide information needed to answer the query within a search result page. Within the short passages, words or short phrases that are highly relevant to the query may be highlighted. Decisions to highlight words or short phrases may be based on relevance scores.

Upon receiving a natural language query from a user or application searching for electronic files such as, but not limited to, web pages, one or more electronic files based upon the query may be identified based upon relevance. The one or more electronic files may be ranked in the order of relevance. Passages from the ranked one or more electronic files may be extracted based on relevance to the query. The passages from the ranked electronic files may be ranked based on relevance to the query.

In examples, a multi-dimensional vector representing words of a passage may be generated by transcoding textual characteristics of each or selections of words of the passage into at least a dimension of the vector. The multi-dimensional vector of the passage may be encoded into a semantic vector representation of the passage. A query may also be encoded into its semantic vector representation. An augmented semantic vector is generated based on the semantic vector representations of the passage and the query. Finally, relevance scores to one or more words of the passage are generated by decoding the augmented semantic vector in conjunction with the multi-dimensional vector of the passage.

In some examples, the relevance scores on one or more words of the passage may be used to highlight relevant words and short phrases of the passage, and present a user with concise answers to the query.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
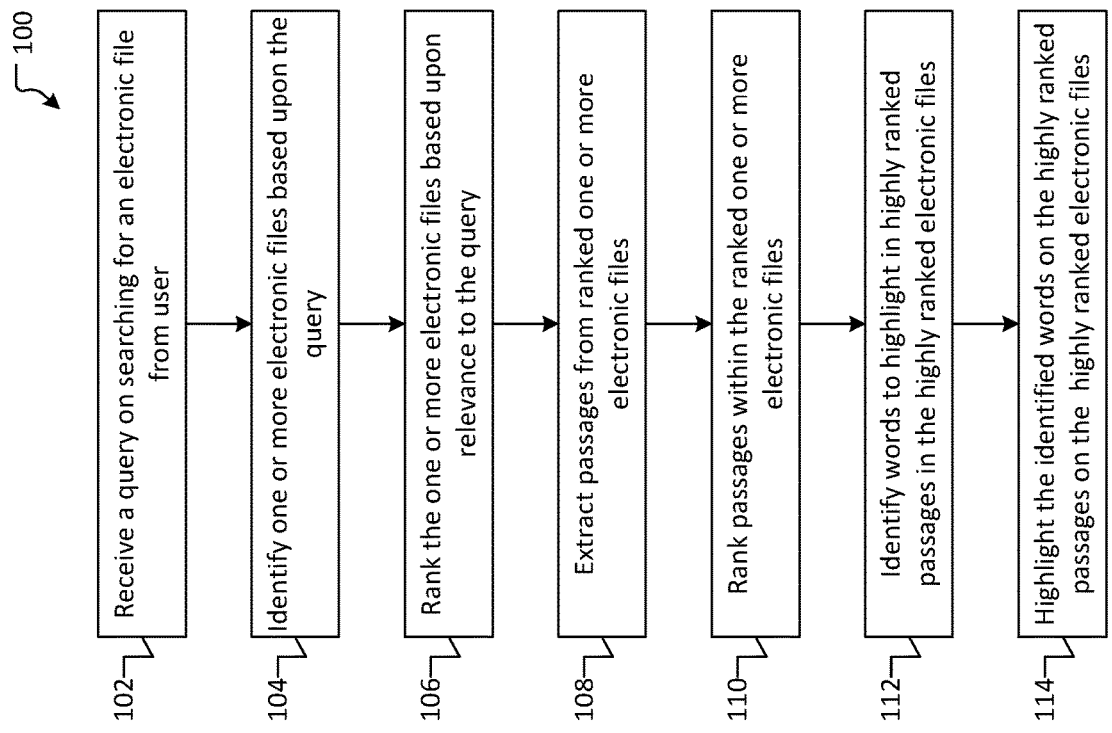
FIG. 1 illustrates a method of highlighting a passage based on a query

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

A wide variety of question and answer systems has become widely available. For instance, there may be local file search programs on handheld devices for providing answers to queries based on electronic files in the handled devices. There may be a distributed information search system such as a web content search system, personal digital assistants, and information bots. A system may receive a natural language query. The system may then search for electronic documents and/or web pages, whether locally or remotely from the computing device that received the query. Upon receiving at least one search result, the system may provide a list of electronic documents, often sorted by the order of relevance to the query as a search result.

In some systems, predefined rules may extract features of the queries. For instance, the systems may identify event-related words that are related to events from the queries.

Examples of the event-related words may include but not limited to "when" and "where" in the queries. The systems may classify phrases and entities into features, if the phrases and entities are related to the event-related words. Additionally or alternatively, a system may parse and recognize certain words and short phrases as specific types of features such as time and date. The system may then search for and receive answer passages that are related to the features. However, there may be issues in providing accurate and concise answer passages to the received queries based on extracting features of the queries. For instance, the system may provide answer passages with a certain level of accuracy and conciseness as long as features are extracted. The answer passage may become less accurate and may become longer in length and thus less concise if features are not extracted from the query.

In examples, entities may be extracted from an answer passage using technologies such as a named entity recognizer (NER). The extracted entities then may be associated with a query and an answer passage to form a set. A classifier, such as a fast tree binary classifier may be used to classify the set of a query, a passage, and/or an entity into various types of classes, such as but not limited to a class. For instance, the set may be highlighted because the query, the answer passage, and the entity are relevant. However, a level of accuracy may depend on an extent of coverage of NER where types of entities are supported by the NER. In particular, not all answer passages may be of entity types. Any answer passage that is not classified may be prevented from being highlighted. Presenting highlighted answers without adequate accuracy may result in receiving more requests such as by mouse clicks through user interactions on computing devices and equipment. Therefore there may be needs for methods and systems to highlight passages more accurately.

Aspects of the present disclosure generally relate to providing an information search system or a question and answer system. The information system or the question and answer system may be capable of providing exact and accurate answers to queries that are received through user interactions and other external inputs. The present disclosure provides systems and methods for generating relevance scores for one or more words of an answer passage generated in response to a query. Such relevance scores may be used to selectively highlight one or more words of an answer passage to a query. A passage with highlights on words that are relevant to a query may be provided to users or may be used for further enhancing search results.

For example, queries may be answered with short passages. The short passages may provide information needed to address the query within a search result page. In aspects, the disclosure may help users easily and quickly find exact words or phrases that are relevant to the query within the answer passage from relevant web pages and files. Among other benefits, aspects of the present disclosure may reduce the time required for user interactions in finding answers to their queries, thereby enhancing the user experience. Additional benefits may include, for example, reducing the amount of data exchanged between two devices by reducing the number of searches or electronic file accesses are required to provide an answer to a query with accuracy FIG. 1 illustrates a method of highlighting an answer passage based on a query. As presented, the method 100 may take a query from a user as an input, searches for electronic files that are relevant to the query and, in certain aspects, also provide one or more passages with highlights in words that are the most relevant to the query.

At receive operation 102, a query may be received. In certain aspects, the received query may be a natural language query received via an application or interface. The received natural language query, in examples, may be received as text and/or as spoken words. The received query may be related to a tasks such as searching one or more electronic files, for example, may be web page contents, text and other data type files, that may reside locally inside a computing device that received the request or remotely, for example, on a server in a distributed system such as over the Internet.

At identify operation 104, one or more electronic files may be identified based upon the query. The one or more electronic files may be identified, for example, by an information search engine such as, but not limited to, an index search engine, graph databases and a traditional information retrieval neural network. In aspect, the one or more electronic files may be identified through searches under a distributed computing environment where the search takes place remotely across networks or the Internet. In another aspect, the one or more electronic files may be identified through searches in one or more local file stores or remote file stores across the network. In aspects, the one or more electronic files may be in such file types as but not limited to one or more web pages, text files, image files, audio files.

At rank operation 106, the one or more electronic files may be ranked based on relevance to the query. For instance a rank may be determined for the one or more electronic files. Based upon the rank, the one or more electronic files may be sorted, for example, from the highest relevance to lower relevance to the query, lowest relevance to highest relevance to the query, etc. In aspects, a part or all of the one or more electronic files may be ranked.

At extract operation 108, one or more passages from one or more ranked electronic files may be extracted as candidates of answers to the query. In aspects, one or more passages may be extracted from one or more electronic files that are ranked with high relevance to the query. For example, passages from the first ten electronic files may be extracted. In some other examples, a number of electronic files from which passages are extracted may be determined through user interactions. In another example, passages from the highest 10 percent of the one or more electronic files may be extracted. In some other examples, different percentages may be used to determine how many electronic files are subject to extracting passages. In aspects, the first ten passages appearing in the one or more ranked electronic files may be extracted. In another aspect, the first passage from a summary section and/or other select sections of the one or more electronic files may be extracted. As should be appreciated, there may be a limit to a number of words in each of extracted passages from the electronic document files to accommodate limitations in a screen size to display words to the user. There may be limitations on a number of words to display based on a computational speed to process the extracted passages.

At rank operation 110, passages within each of the ranked electronic files may be ranked based on relevance to the query. In aspects, a passage within the ranked electronic files may be ranked higher than other passage if the passage has a higher relevance to the query. For instance, a passage that contains more number of words that appear in the query may be ranked higher than other passages. Based upon the rank, the one or more passages may be sorted, for example, from the highest relevance to lower relevance to the query, lowest relevance to highest relevance to the query, etc. In aspects, a part or all of the one or more passages may be ranked.

At identify operation 112, words in the ranked passages, which are relevant to the query may be identified. The words are identified based on a relevance score to at least one word of the ranked passages. Additionally or alternatively, short phrases in the ranked passages may be identified.

In aspects, words to be highlighted within each of the passages within the ranked electronic files may be identified based on relevance scores for respective passages with respect to the query. For instance, a multi-dimensional vector that represents words of each passage to be ranked may be generated. For example, each dimension of the vector may represent one or more words of the passage. Then, the multi-dimensional vector of the passage may be encoded into a semantic vector representation of the passage using a Recurring Neural Networks (RNN) with Long Short-Term Memory Networks (LSTM) as an encoder. A semantic vector representation of the query may be generated. The semantic vector representation of the query may be generated using a RNN with LSTM as an encoder.

In some aspects, an augmented semantic vector representation of the semantic vectors of the passage and the query may be generated through an augmentation processing. For instance, the augmentation processing, such as splice and join processing, may be used to generate the augmented semantic vector representation of the semantic vectors of the passage and the query. Finally relevance scores to each of at least one word within the passage may be generated by decoding the augmented semantic vector with the multi-dimensional vector of each of the respective passages. For example, the decoding may be processed by using an RNN with LSTM by using the augmented semantic vector and the multi-dimensional vector of each of the respective passages as input. The relevance score may represent a degree of relevance between each of the passages and the query. Finally one or more words with relevance scores with values that are above a predetermined threshold value may be identified.

At highlight operation 114, the identified words in the ranked passages in the highly ranked electronics may be highlighted, and presented to the user. For instance, the identified words may be highlighted in yellow, red, or other color that contrasts with the foreground color of the words and the background of the screen. In other instance, highlighted words may be displayed in bold font type, in italic font type or other font types. In yet another example, highlighted words may be underscored, blinking, flashing and other ways of rendering words, which would enable the highlighted words to be identified easily through user interactions.

Figure 2:
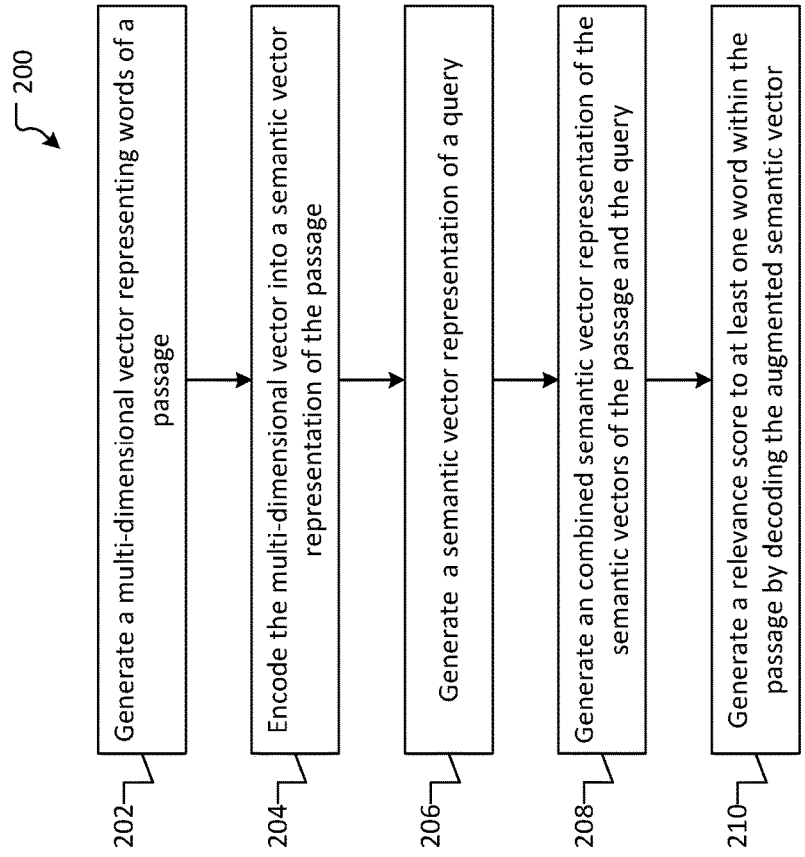
FIG. 2 illustrates a method of generating a highlighted passage.

FIG. 2 illustrates a method of identifying words from a passage to highlight. The method 200 may correspond to the identify operation 112 as shown in FIG. 1. For instance, words of a passage that is ranked within a ranked electronic file may be processed, and some of words may be identified for highlighting. For example, words that are particularly relevant to the query based on relevance scores may be identified for highlighting.

At generate operation 202, a multi-dimensional vector from a given passage may be generated to represent the given passage. In aspects, the passage may be transformed into textual vectors word by word, by transcoding or vectorising each word based on textual characteristics. There may be at least one multi-dimensional vector per word for which a relevance score is to be generated. In some systems, the vector conversion of words in a passage may convert each word in the passage into at least one dimension of a multi-dimensional vector that represents textual characteristics of the passage. One or more textual vectors may be generated from the passage. In some example, the one or more textual vectors may be generated by converting respective words into a multi-dimensional vector form with use of a mapping table of words and vectors, without vector transformations based on semantic analysis of the words and the passage. In aspects the vector conversion (embedding) of passage may send the textual vector of passage (not shown in figure) to an encode operation 204.

At encode operation 204, the multi-dimensional vectors of the passage may be encoded into a multi-dimensional, semantic vector representation of the passage. In aspects, a bidirectional RNN with LSTM may be deployed to process the multi-dimensional vectors of the passage while incorporating semantics of the passage into the multi-dimensional semantic vectors. For instance, the RNN with LSTM may have no dependency on extracting entities using named entity recognizer (NER). Use of NER may limit the scope of extracting entities to those that are already registered to NER. Not all answers are entity types and thus use NER may prevent some words from being highlighted. If the words are not already registered as entities. On the other hand, RNNs may propagate information via a chain-like neural network architecture. While standard RNNs are unable to learn long-term dependencies especially when the gap between two words that are compared becomes large, an RNN with LSTM may accommodate the long-term dependencies. LSTM may be a special type of RNN. LSTMs may be capable of learning long-term dependencies. An LSTM may contain a chain-like structure of repeating modules. Each repeating module in an LSTM may contain multiple interacting layers, which may retain or forget values in each layer. Moreover, the multiple layers may collectively decide resulting memory. For example, LSTM may enable generating a semantic vector by taking into account semantics as indicated by words that are far a part in the passage. For example, the multi-dimensional semantic vector representation of the passage may be a combination of final hidden state of LSTM over passage words in forward direction and the final hidden state of LSTM over passage words in backward direction.

At generate operation 206, a multi-dimensional vector that represents the query may be generated. In aspects, the generation operation 206 may be similar to a combination of the generate operation 202 and the encode operation 204, except that the query is used instead of the passage in the generate operation 206. In other aspect, the multi-dimensional semantic vector representation of the query may be a combination of final hidden state of LSTM over query words in forward direction and the final hidden state of LSTM over query words in backward direction. In an example, the semantic vector of the passage and the semantic vector of the query may share the same weights in LSTM.

In aspects the vector conversion (embedding) of query may send the textual vector of query (not shown in figure) to the generate operation 206. At generate operation 206 the multi-dimensional vectors of the query may be encoded into a multi-dimensional, semantic vector representation of the query. In aspects, a bidirectional RNN with LSTM may be deployed to process the multi-dimensional vectors of the query while incorporating semantics of the query into the multi-dimensional semantic vectors. For instance, the RNN with LSTM may have no dependency on extracting entities using named entity recognizer (NER). Use of NER may limit the scope of extracting entities to those that are already registered to NER. Not all answers are entity types and thus use NER may prevent some words from being highlighted.

If the words are not already registered as entities. On the other hand, RNNs may propagate information via a chain-like neural network architecture. While standard RNNs may be unable to learn long-term dependencies especially when the gap between two words that are compared becomes large, RNN with LSTM may accommodate the long-term dependencies. LSTM may be a special type of RNN. LSTMs may be capable of learning long-term dependencies. An LSTM may contain a chain-like structure of repeating modules. Each repeating module in an LSTM may contain multiple interacting layers, which may retain or forget values in each layer. Moreover, the multiple layers may collectively decide resulting memory. For example, LSTM may enable generating a semantic vector by taking into account semantics as indicated by words that are far a part in the passage. For example, the multi-dimensional semantic vector representation of the query may be a combination of final hidden state of LSTM over query words in forward direction and the final hidden state of LSTM over query words in backward direction.

At generate operation 208, an augmented semantic vector that represents the multi-dimensional vectors of both the passage and the query may be generated. For example, the augmented semantic vector may be generated by concatenating the multi-dimensional semantic vectors of the passage and the query. The augmented semantic vector may be a multi-dimensional vector. In another example, a splice vector operation function may be used to join the two multi-dimensional semantic vectors together. In yet another example, at least one dimension of the multi-dimensional semantic query vector may be augmented with more weight than the multi-dimensional semantic passage vector. This way, there may be more bias toward how the query is represented than the passage. In another example, at least one dimension of the multi-dimensional semantic passage vector may be augmented with more weight than the multi-dimensional semantic query vector. This way, there may be more bias toward how the passage is represented than the query. In aspects, the two multi-dimensional vectors of the passage and the query may be augmented with equal weight.

At generate operation 210, a relevance score to at least one word within the passage may be generated, by decoding the augmented semantic vector. In aspects, a bidirectional recurring neural network with LSTM, as well as a SOFTMAX processing may be used to generate a relevance score by converting a probability into a score using at least one threshold value. For instance, the SOFTMAX processing may receive a value of a vector that represent one or more words within the passage. The value of the vector may be compared against the at least one threshold value. Based on a result of the comparison, the value of the vector is classified into at least one category. Each category may be associated with a relevance score. Accordingly, a relevance score for the at least one word within the passage may be generated for the at least one word within the passage. Each of the at least one category, which is associated with a relevance score, may indicate a degree of highlighting the at least one word within the passage.

After the generate operation 210 is completed on the passage, different parts of the passage may have different relevance scores, which may translate into different types of highlights. For example, at least one word with a select range of relevance scores may be highlighted with a color such as yellow. In some other example, the at least one with the select range of relevance scores may be highlighted in bold font type. In yet another example, each range of multiple ranges of relevance scores may be associated with different colors in the order of relevance, and may be highlighted accordingly.

Figure 3:
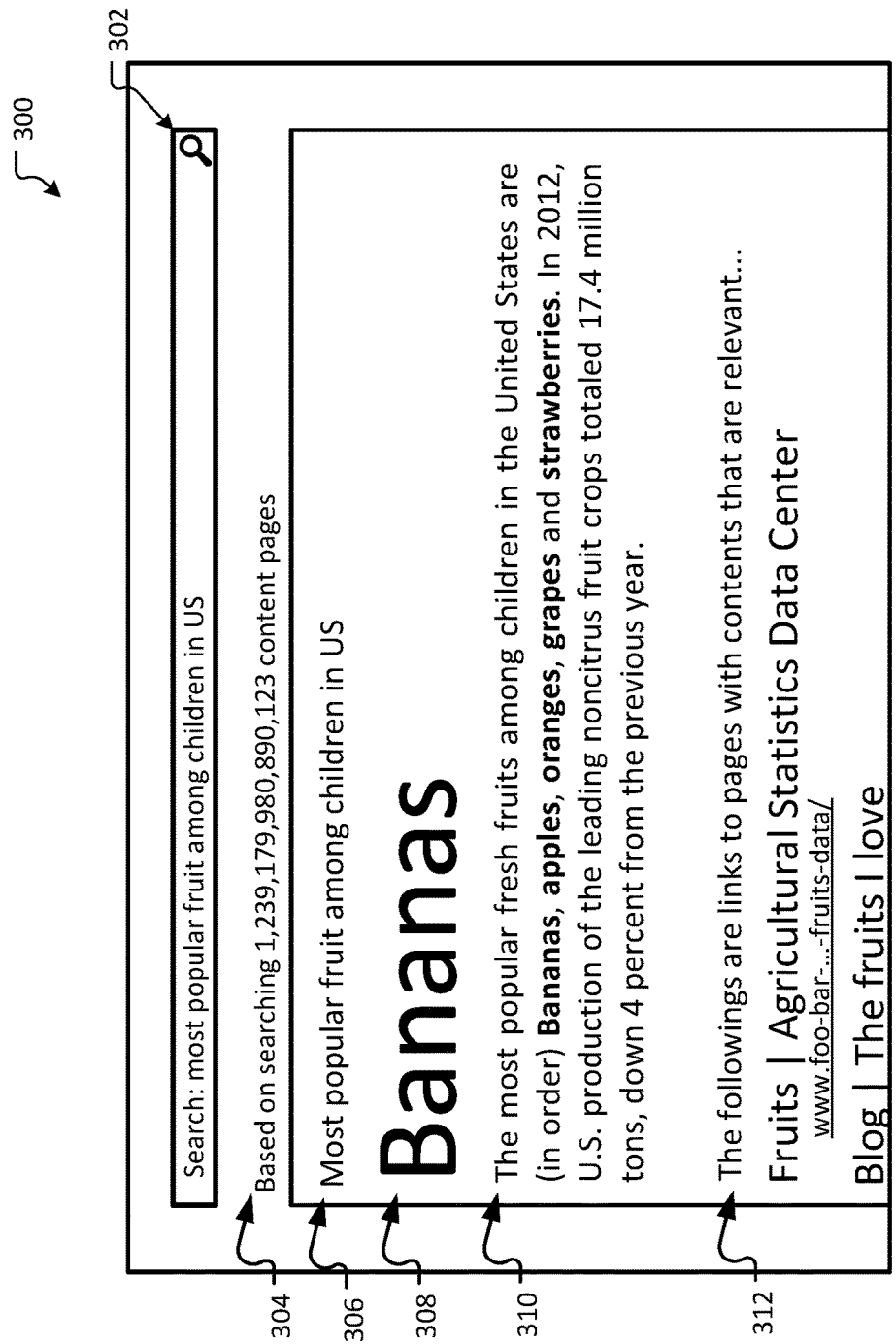
FIG. 3 illustrates an example display of search results with highlighted passage.

FIG. 3 illustrates an example screen display of search results with highlighted passage. The example screen 300 may provide a graphical user interface to a user to search for electronic files or information in an information store. As illustrated, a query input pane 302 may include a data input area where a user may enter a query to a search. The example shows that the user entered a query "most popular fruit among children in US" in the query input pane 302. The query may be in a natural language phrase or a sequence of words. Additionally or alternatively, the query as entered by a user or an application program may be in forms other than text, such as audio and images, and the query in the form of words may be extracted or transformed from the input. As illustrated, a number of content pages that the search operated upon is shown at a search range description 304. For example, the search result may be "Based on searching 1,239,179,980,890,123 content pages." Query description line 306 may indicate a query text that is processed upon. In the exemplary scenario, the query is "Most popular fruit among children in US." The most relevant word 308 may be the word that is the most relevant to the query from the highly ranked passages in the highly ranked electronic documents. For example, "Bananas" is shown as the most relevant word 308 based on the given query. Passage 310 may be a passage that is identified as the most relevant passage in the highly ranked electronic documents. Additionally or alternatively, the passage may be from the highest ranked electronic document. The displayed passage may contain words that are highlighted in bold. The words that are highlighted in bold ("Bananas", "apples", "oranges", grapes" "strawberries" in the figure) may be identified as having high relevance scores. In this example, the word "Bananas" is presented as the most relevant word among the four words in the answer passage against the query. Additionally or alternatively, more relevant phrases may be identified. A list of relevant contents 312 may be a list of electronic document files or web contents in the order of relevance to the query. Each item of the list may comprise a title of the electronic document file and a link to the electronic document file.

Figure 4:
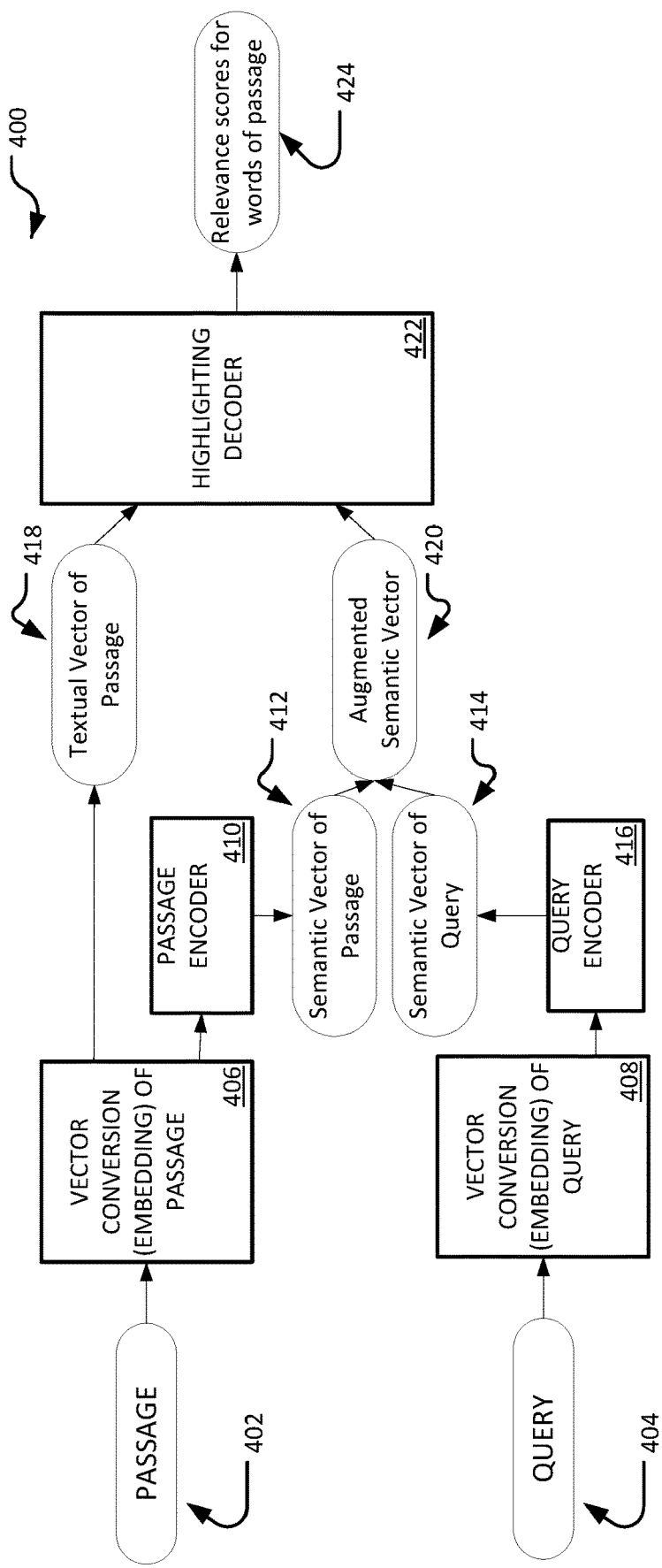
FIG. 4 illustrates an overview of example system to generate relevance scores for words of passage

FIG. 4 illustrates an overview of example system to generate relevance scores for words of passage. Example system 400 may be a combination of interdependent components that interact to form an integrated whole for performing aspects disclosed herein. In aspects, system 400 may include hardware components (e.g., used to execute/run operating system (OS)), and/or software components (e.g., applications, application programming interfaces (APIs), modules, virtual machines, runtime libraries, etc.) running on hardware. In particular aspects, system 100 may provide an environment for software components to execute, evaluate operational constraint sets, and utilize resources or facilities of the system 400. In such aspects, the environment may include, or be installed on, one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic device. As an example of a processing device operating environment, refer to the exemplary operating environments depicted in FIGS. 7-10. In other instances, the components of systems disclosed herein may be distributed across and executable by multiple devices. For example, input may be entered on a client device and information may be processed or accessed from other devices in a network (e.g. server devices, network appliances, other client devices, etc.).

As presented, system 400 may include, but not limited to, input data such as passage 402 and query 404, vector conversion (embedding) of passage 406, vector conversion (embedding) of query 408, passage encoder 410, query encoder 416, semantic vector of passage 412, semantic vector of query 414, textual vector of the passage 418, augmented semantic vector 420, highlighting decoder 422 and relevance scores for words of passage 424. One of skill in the art will appreciate that the scale of systems such as system 400 may vary and may include additional or fewer components than those described in FIG. 4. In some aspects, interfacing between components of the system 400 may occur remotely, for example, where components of system 400 may be distributed across one or more devices of a distributed network.

In aspects, vector conversion (embedding) of passage 406 may take a passage, which may be one of candidate answer passages identified by executing a search based on a given query 404. As should be appreciated, the passage 402 may be in a natural language. The vector conversion (embedding) of passage 406 may generate a textual vector of passage 418 of the passage 402. In some systems, the vector conversion of passage 406 may convert a word in the passage 402 into a multi-dimensional vector 418 that represents the word. One or more textual vectors 418 may be generated from a passage 402. In some example, the one or more textual vectors 418 may be generated by converting respective words into a multi-dimensional vector form with use of a mapping table of words and vectors, without vector transformations based on semantic analysis of the words and the passage.

In aspects, vector conversion (embedding) of passage 406 may send the textual vector of passage (not shown in figure) to passage encoder 410. Passage encoder 410 may generate a semantic vector of the passage 412 based upon the textual vector. As should be appreciated, Passage encoder 410 may be implemented by an RNN with LSTM. For example, Passage encoder 410 may generate a semantic vector of passage 412 by executing a series of transformation of each of the textual vector representation by incorporating semantics of the passage based on LSTM during iterative and recurring transformations of the vectors. In aspects, a bidirectional RNN with LSTM may be deployed to process the multi-dimensional vectors of the passage. For instance, the RNN with LSTM may have no dependency on extracting entities using named entity recognizer (NER). Use of NER may limit the scope of extracting entities to those that are already registered to NER. Not all answers are entity types and thus use NER may prevent some words from being highlighted. If the words are not already registered as entities. On the other hand, RNNs may propagate information via a chain-like neural network architecture. While standard RNNs may be unable to learn long-term dependencies especially when the gap between two words that are compared becomes large, an RNN with LSTM may accommodate the long-term dependencies. LSTM may be a special type of RNN. LSTMs may be capable of learning long-term dependencies. An LSTM may contain a chain-like structure of repeating modules. Each repeating module in an LSTM may contain multiple interacting layers, which may retain or forget values in each layer. Moreover, the multiple layers may collectively decide resulting memory. For example, LSTM may enable generating a semantic vector by taking into account semantics as indicated by words that are far a part in the passage. For example, the multi-dimensional semantic vector representation of the passage may be a combination of final hidden state of LSTM over passage in forward direction and the final hidden state of LSTM over passage in backward direction.

In aspects, the vector conversion (embedding) of query 408 may send the textual vector of query (not shown in figure) to query encoder 416. Query encoder 416 may generate a semantic vector of the query 414 based upon the textual vector. As should be appreciated, Query encoder 416 may be implemented by an RNN that incorporates LSTM. For example, Query encoder 416 may generate a semantic vector of query 414 by iteratively executing transformations on each of the textual vector representations by incorporating semantics of the query based on long and short-term memories during iterative and recurring transformations of the vectors. In aspects, a bidirectional RNN with LSTM may be deployed to process the multi-dimensional vectors of the query. For instance, the RNN with LSTM may have no dependency on extracting entities using named entity recognizer (NER). Use of NER may limit the scope of extracting entities to those that are already registered to NER. Not all answers are entity types and thus use NER may prevent some words from being highlighted. If the words are not already registered as entities. On the other hand, RNNs may propagate information via a chain-like neural network architecture. While standard RNNs may be unable to learn long-term dependencies especially when the gap between two words that are compared becomes large, an RNN with LSTM may accommodate the long-term dependencies. LSTM may be a special type of RNN. LSTMs may be capable of learning long-term dependencies. An LSTM may contain a chain-like structure of repeating modules. Each repeating module in an LSTM may contain multiple interacting layers, which may retain or forget values in each layer. Moreover, the multiple layers may collectively decide resulting memory. For example, LSTM may enable generating a semantic vector of the query by taking into account semantics as indicated by words that are far a part in the query. For example, the multi-dimensional semantic vector representation of the query may be a combination of final hidden state of LSTM over query in forward direction and the final hidden state of LSTM over query in backward direction.

In aspects, the augmented semantic vector 420 may be generated based on semantic vector of passage 412 and semantic vector of query 414. The augmented semantic vector 420 may be generated, for example, by concatenating the two semantic vector representations of passage and query (412 and 414 respectively). The augmented semantic vector 420 may be a multi-dimensional vector representation of semantics of a pair of the passage 402 and the query 404. The augmented semantic vector may be a multi-dimensional vector. In another example, a splice vector operation function may be used to join the two multi-dimensional semantic vectors together. In yet another example, at least one dimension of the multi-dimensional semantic query vector may be augmented with more weight than the multi-dimensional semantic passage vector. This way, there may be more bias toward how the query is represented than the passage. In another example, at least one dimension of the multi-dimensional semantic passage vector may be augmented with more weight than the multi-dimensional semantic query vector. This way, there may be more bias toward how the passage is represented than the query. In aspects, the two multi-dimensional vectors of the passage and the query may be augmented with equal weight.

In aspects, a highlighting decoder 422 may receive a multi-dimensional textual vector of passage 418 and an augmented multi-dimensional semantic vector 420, and may generate a set of relevance scores for words of passage 424. As should be appreciated, highlighting decoder 422 may be implemented by a combination of a bi-directional RNN that incorporates LSTM and a set of SOFTMAX operator (now shown in FIG. 4 but shown in FIG. 5B). For example, highlighting decoder 422 may first generate a multi-dimensional vector representation for respective words of the passage 402 by first executing a series of transformation of each of the textual vector representation. In some aspects, semantics of the query-passage pair may be incorporated into generating relevance scores by decoding the augmented semantic vector 420. In some other aspect, decoding may be based on combinations of long and short-term memories during iterative and recurring transformations of the vectors. In aspects, relevance scores for respective words of the passage 402 may be generated by the SOFTMAX operator to represent a probability distribution.

The relevance scores for words of passage 424 may comprise multiple levels of scores. For example, some example having two levels (i.e. scores may have a value 0 or 1) may be implemented as follows: a score value 0 may represent that a corresponding word is low in probability score and thus not relevant enough to be highlighted. Score value 1 may represent that a corresponding word is high in probability of being relevant, and thus relevant enough to be highlighted. Additionally or alternatively, relevance scores may comprise more than two levels. Resulting relevance scores may be used to present the passage with more than one type of highlight. In some aspects, a resulting relevance score may be associated with more than one word of the passage 402. In some example, relevance scores may be used as an input to generate an overall association mapping that may depict how different levels of relevance scores are distributed among the ranked passages and among the highly ranked electronic files. The resulting relevance scores may be displayed or presented as search results.

Figure 5A:
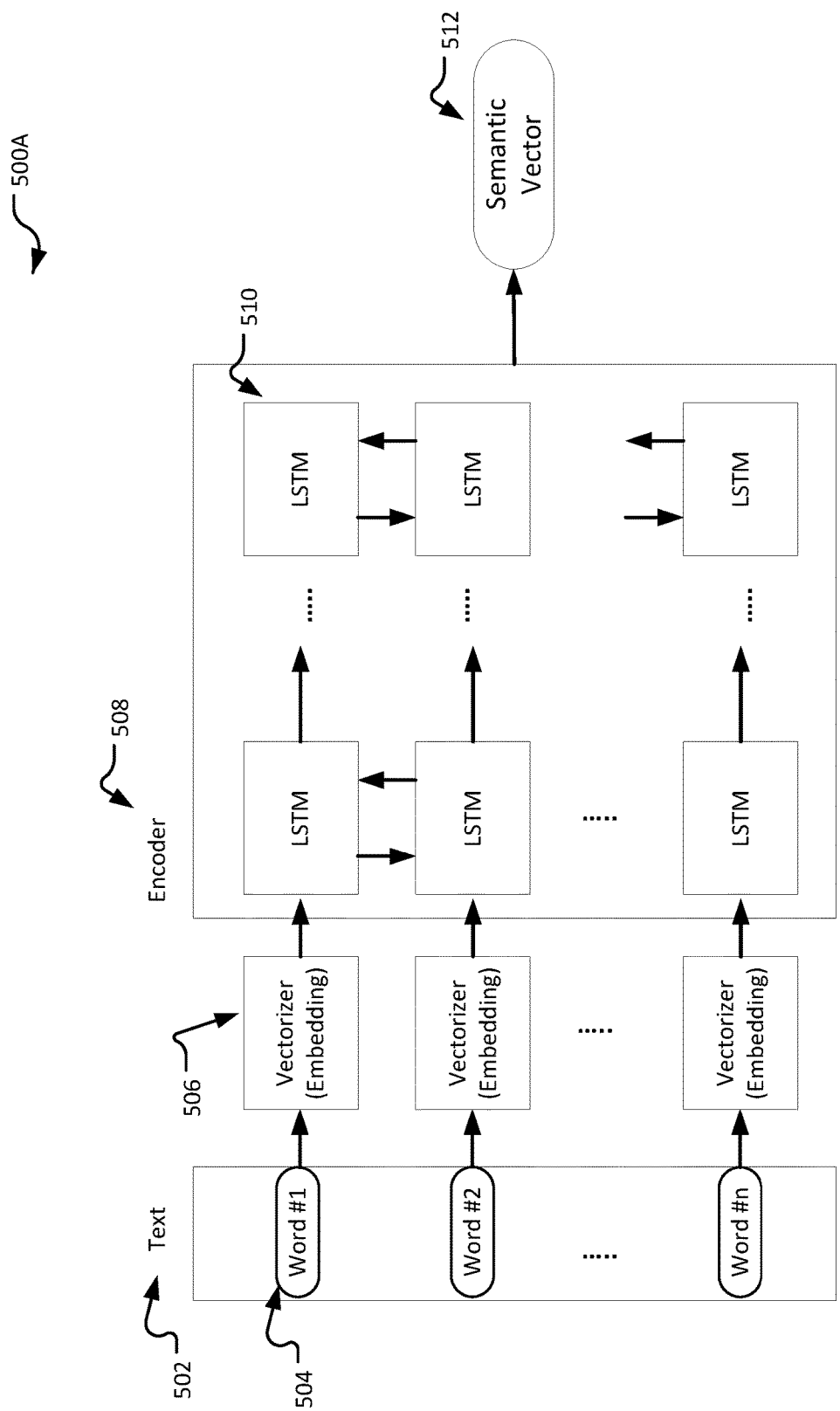
FIG. 5A illustrates an overview of example system to generate a semantic vector

FIG. 5A illustrates an overview of an example system to generate a semantic vector from a set of words in a text using a neural network as an encoder. As presented, the system 500A may consist of a set of words that constitute a text 502 as an input, a series of vectorizers 506 that may transform each word of the text into one or more of multi-dimensional textual vectors and an encoder 508 may generate a multi-dimensional semantic vector 512 that represent the input text 502. Encoder 508 may be analogous to passage encoder 410 in FIG. 4, which may take a set of multi-dimensional textual vectors that represent words of a passage 402 as an input and may generate at least one multi-dimensional semantic vector of the input. Encoder 508 may also be analogous to query encoder 410 in FIG. 4, which may takes a set of multi-dimensional textual vectors. The set of multi-dimensional textual vectors may represent a query 404 as an input and may generate at least one semantic vector of the input. In aspects, an encoder 508 may be a bidirectional RNN with at least one LSTM 510, which may be placed in layers. Each layer (a layer shown as a vertical set of LSTMs in the figure) may consist of one LSTM per one textual vector representation of words of the passage 402. LSTMs may retain both long and short-term memories in semantically interpreting textual vector representations of the set of words as an input. In aspects, the multi-dimensional semantic vector 512 may be a splice (join) of the last hidden states of the LSTM components over the words in the passage in both directions of the neural network.

For example, a text 502 may consist of n words. The text 502 may be provided as an input to the system, starting with Word #1 (504). A set of vectorizers 506 may generate a multi-dimensional textual vector, at least each dimension corresponding to each word of the text 502. The multi-dimensional textual vector may capture textual characteristics of each word of the text 502. Then, the multi-dimensional textual vector may be fed to the Encoder 508, as indicated by the set of vertically aligned arrows, each pointed to an LSTM in the left most (first) layer of the Encoder 508. Based on weights assigned to each LSTM, semantic values of text 502 are generated by evaluating words iteratively across multiple layers as the values are propagated across layers. In particular, use of LSTM may enable generating semantic values through considerations of both words that are adjacent or close to one another, as well as a far a part in the text 502. Propagation of values across LSTM within a layer of the neural network is indicated by vertically-pointed arrows between LSTMs within one column of LSTMs.

Figure 5B:
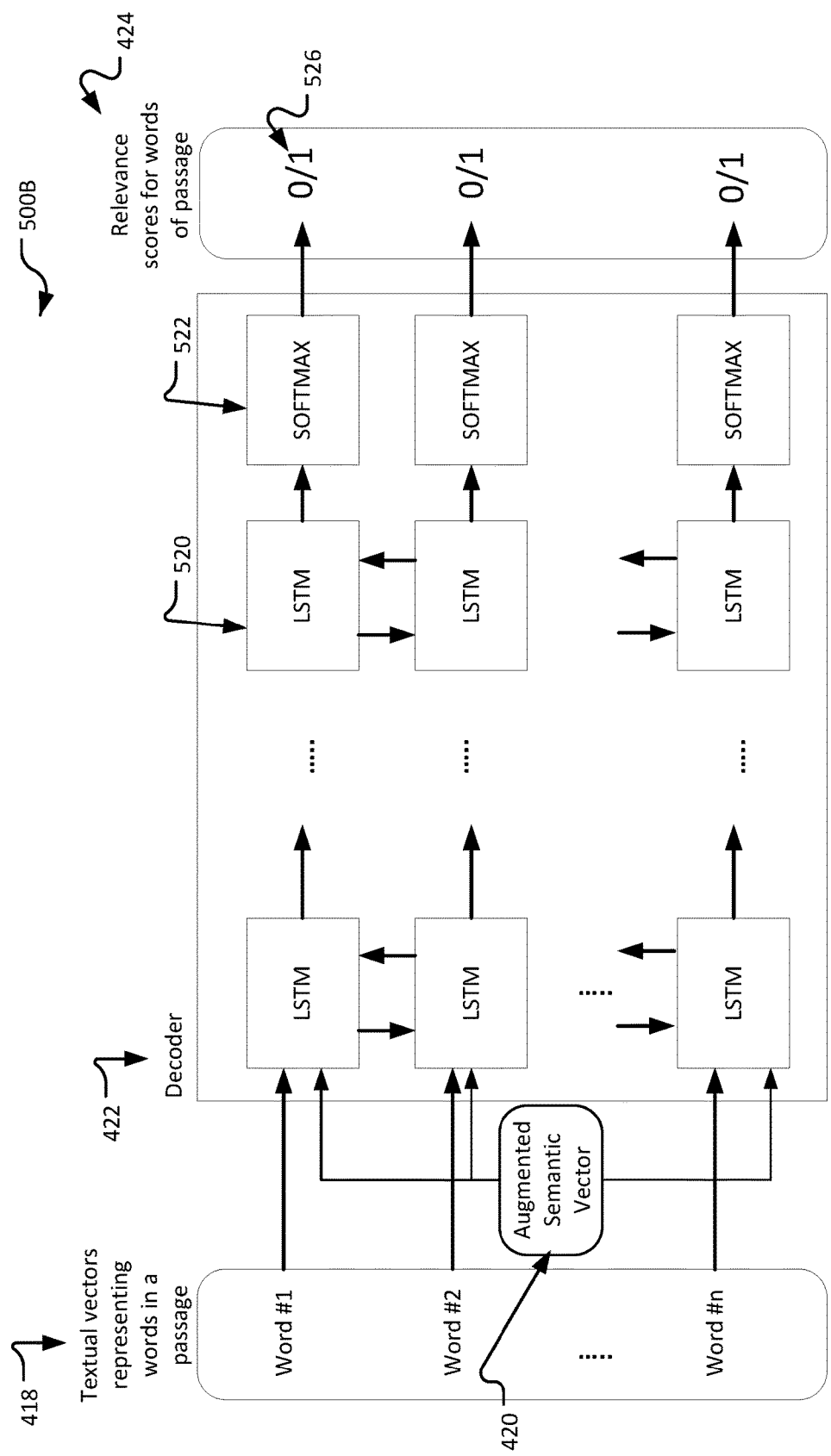
FIG. 5B illustrates an overview of example system to generate relevance scores using a decoder

FIG. 5B illustrates an overview of an example system to generate relevance scores using a neural network as a decoder. As presented, the system 500B may consist of a set of textual vectors representing words in a passage 418, an augmented semantic vector 420 of a semantic query vector and a semantic passage (answer) vector, a decoder 422, and a set of relevance scores for words of passage 424. In some example, each of the textual vector may be a multi-dimensional vector that represents a word in a passage.

In aspects a decoder 422 may consist of at least one layer of LSTM 520 (each layer shown as a set of vertically aligned LSTMs in the figure) forming a bidirectional RNN and one or more layer of SOFTMAX 522. Unlike the encoder 508, which receives at least one multi-dimensional textual vector as input, shown in FIG. 5A, the decoder 422 receives at least one multi-dimensional textual vector as well as the augmented semantic vector 420 of a semantic passage vector and a semantic query vector as input, as shown by a set of incoming arrows to the left-most column of the set of LSTM (i.e. the first layer of the neural network) in FIG. 5B. Moreover, the decoder 422 may comprise a set of SOFTMAX 522, which may hidden state of the last (i.e. the deepest) LSTM layer to generate relevance scores 424.

The SOFTMAX 522 may transform a multi-dimensional vector that may represent a probability into a value, which may indicate whether a word in a passage is relevant to semantics that is represented by the augmented semantic vector 420. For example, a relevance score may indicate whether a word in an answer phrase as a passage is relevant enough against a query to be highlighted. LSTMs may retain both long and short-term memories in semantically interpreting textual vector representations of the input passage. In aspects a relevance score is shown as a value either 0 or 1, where 0 may indicate not relevant enough to be highlighted and 0 may indicate that the word is relevant enough to be highlighted. In some other example, SOFTMAX 522 may output a value that ranges more than two levels, such as from −100 to +100. Such a finer granularity of relevance scores may be used to compare relevance of words in answer phrases against their query in finer details to identify relevant short phrases, and for further processing to find more accurate results, for example. In aspects, the multi-dimensional semantic vector 512 may be a splice (join) processing of the last hidden states of the LSTM components over the words in the text 502 in both directions of the neural network. The splice (join) processing is indicated by a set of SOFTMAX 522 in Decoder 422, each processing each dimension of the textual vector 418.

In some example, the first layer of the RNN with LSTM may receive at least one textual vector 418 of the passage as well as the augmented semantic vector 420 as input. The first layer may generate state values by utilizing long short-term memory on semantics of both adjacent words and distant words in the passage for the second layer. The subsequent layers of the RNN with LSTM may receive state values from a higher layer, and process in a recurring manner. The SOFTMAX 522 may receive a set of state values from the last layer of RNN, and may generate relevance scores 526 for words of the passage 424.

In aspects, one or more values or range of relevance scores may associated with at least one label. For example, a value 1 of the relevance scores 526 may be associated with a label "important." Words with the relevance score value 1 may be depicted in yellow color as the background color. Similarly, a value 0 of the relevance scores 526 may be labeled as "neutral." Words with relevance score 0 may be depicted in white color as the background color.

Figure 6:
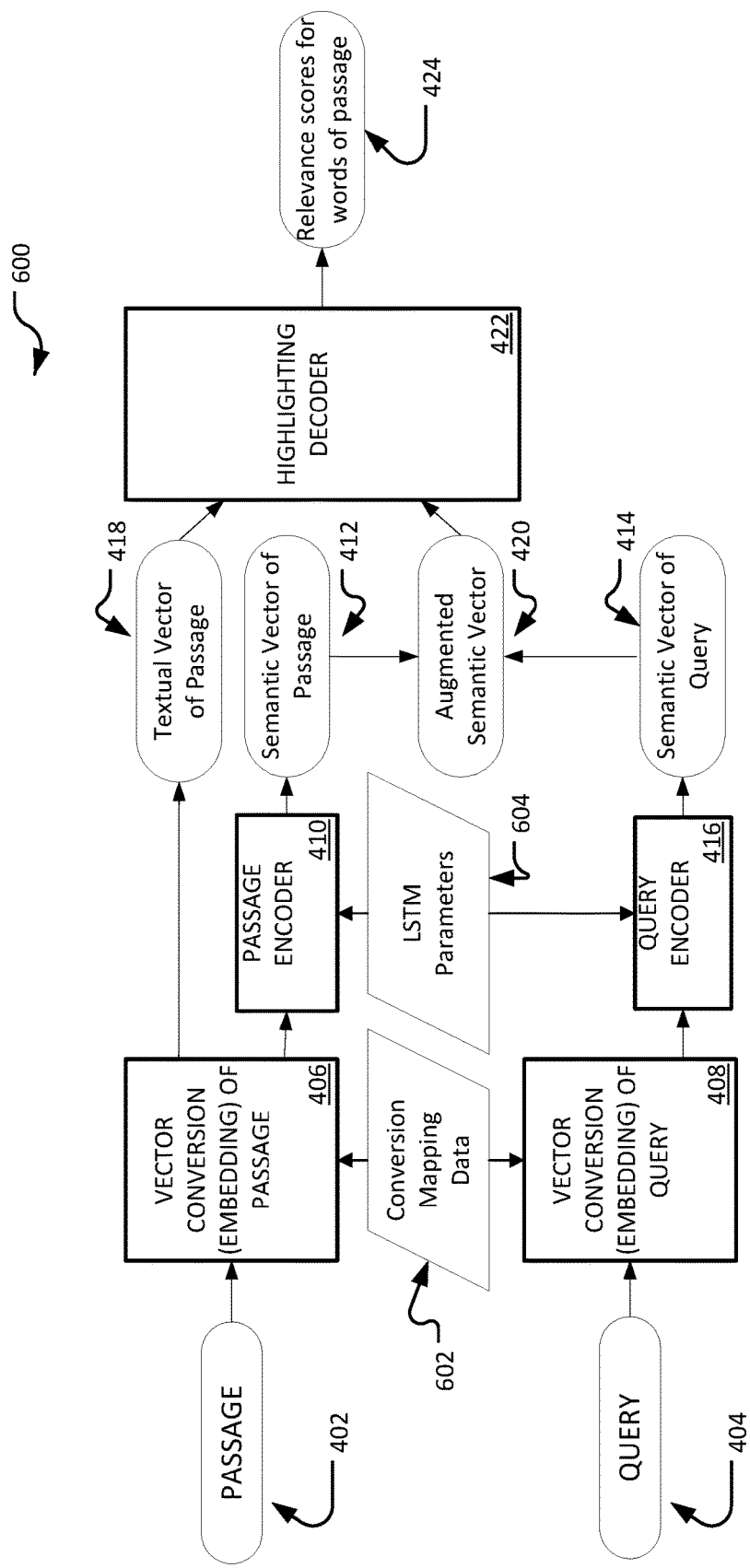
FIG. 6 illustrates an overview of example system to generate relevance scores for words of passage.

FIG. 6 illustrates an overview of example system to generate relevance scores for words of passage, wherein an identical set of parameters may be used for processing both query and passage. As presented, a conversion mapping data 602 may be shared between a vector conversion (embedding) of passage 406 and a vector conversion (embedding) of query 408. The conversion mapping data 602 may be used as a set of mapping parameters in converting each word of a text into a multi-dimensional textual vector that represents each word. As presented, LSTM parameters 604 may be shared between a passage encoder 410 and a query encoder 416. In aspects a passage 402 may be one of the ranked passages within the ranked electronics files as ranked in step 110 as a result of searching based on the received query in step 102. Sharing the same set of parameters in respective neural networks for the passage encoder 410 and the query encoder 416 may be beneficial to maintain the level of consistency and accuracy of generating respective multi-dimensional semantic vectors. In addition, a use of shared parameters may be effective in situations such as implementing on a mobile handheld device, where an availability of memory space may be limited in the system.

FIGS. 7-10 and the associated descriptions provide a discussion of a variety of operating environments in which aspects of the disclosure may be practiced. However, the devices and systems illustrated and discussed with respect to FIGS. 7-10 are for purposes of example and illustration and are not limiting of a vast number of computing device configurations that may be utilized for practicing aspects of the disclosure, described herein.

Figure 7:
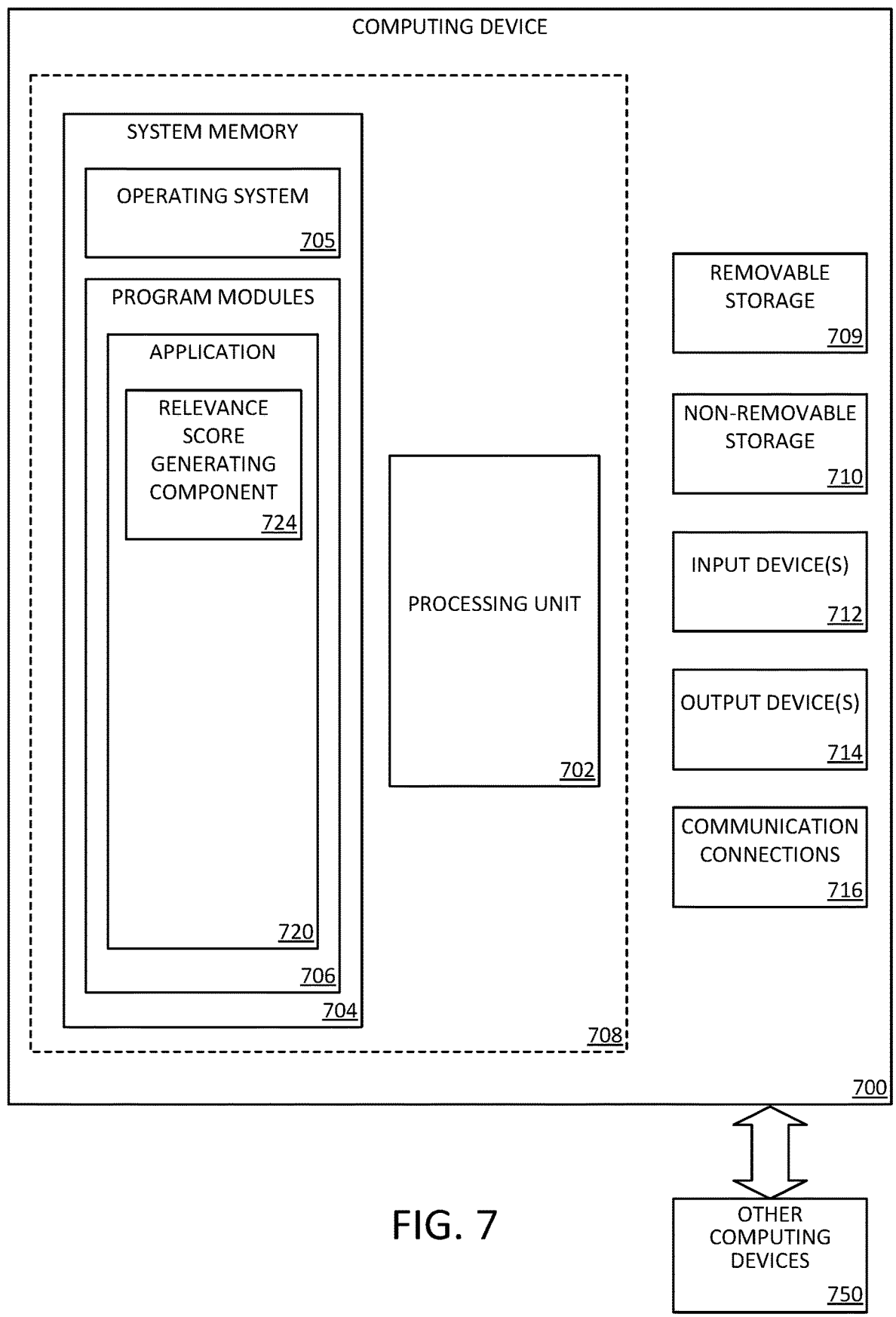
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for performing the various aspects disclosed herein such as a relevance score generation component 724. The operating system 705, for example, may be suitable for controlling the operation of the computing device 700. Furthermore, embodiments of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., application 720) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
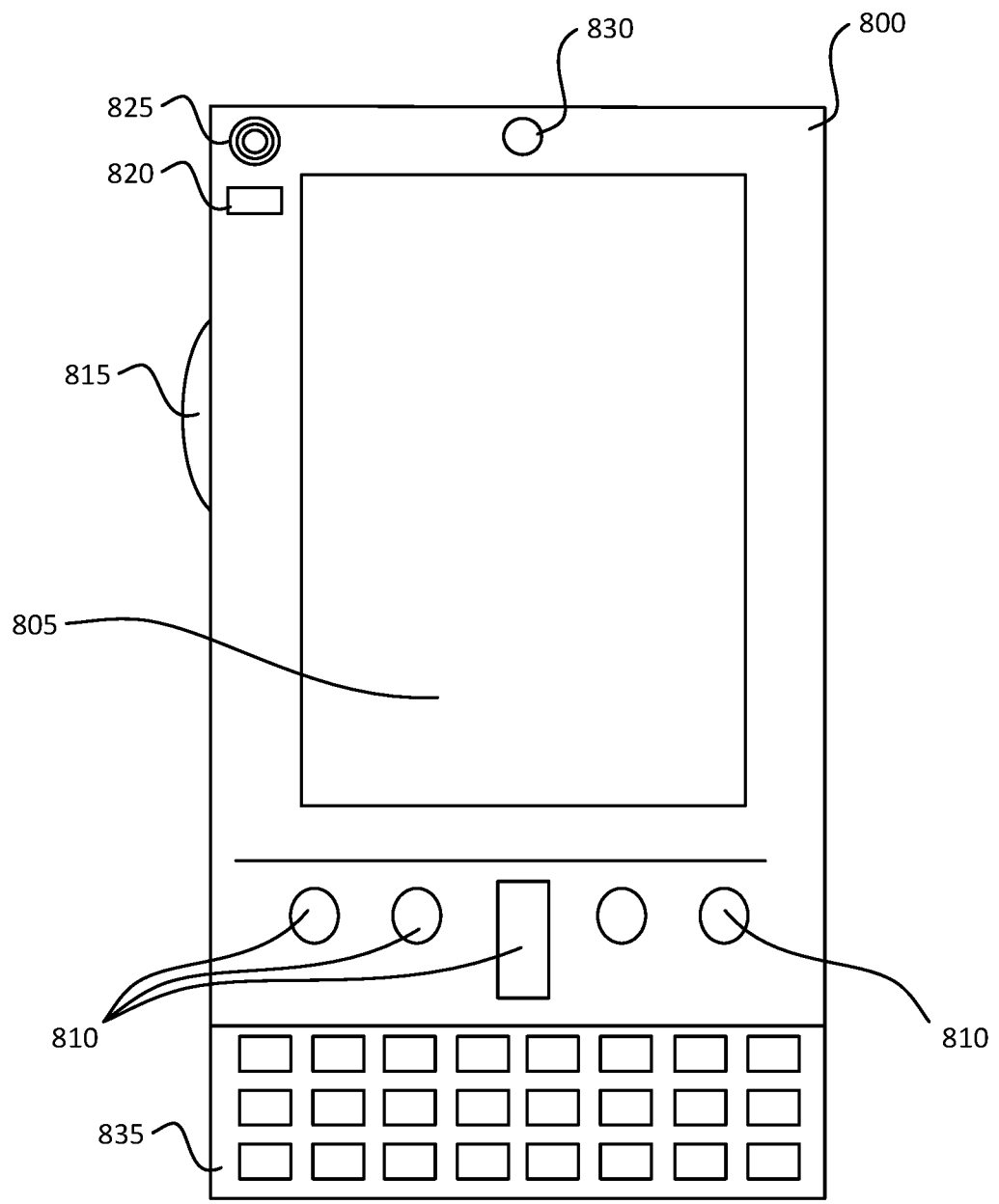
FIGS. 8A and 8B are simplified block diagrams of a mobile computing device with which aspects of the present disclosure may be practiced.
Figure 8B:
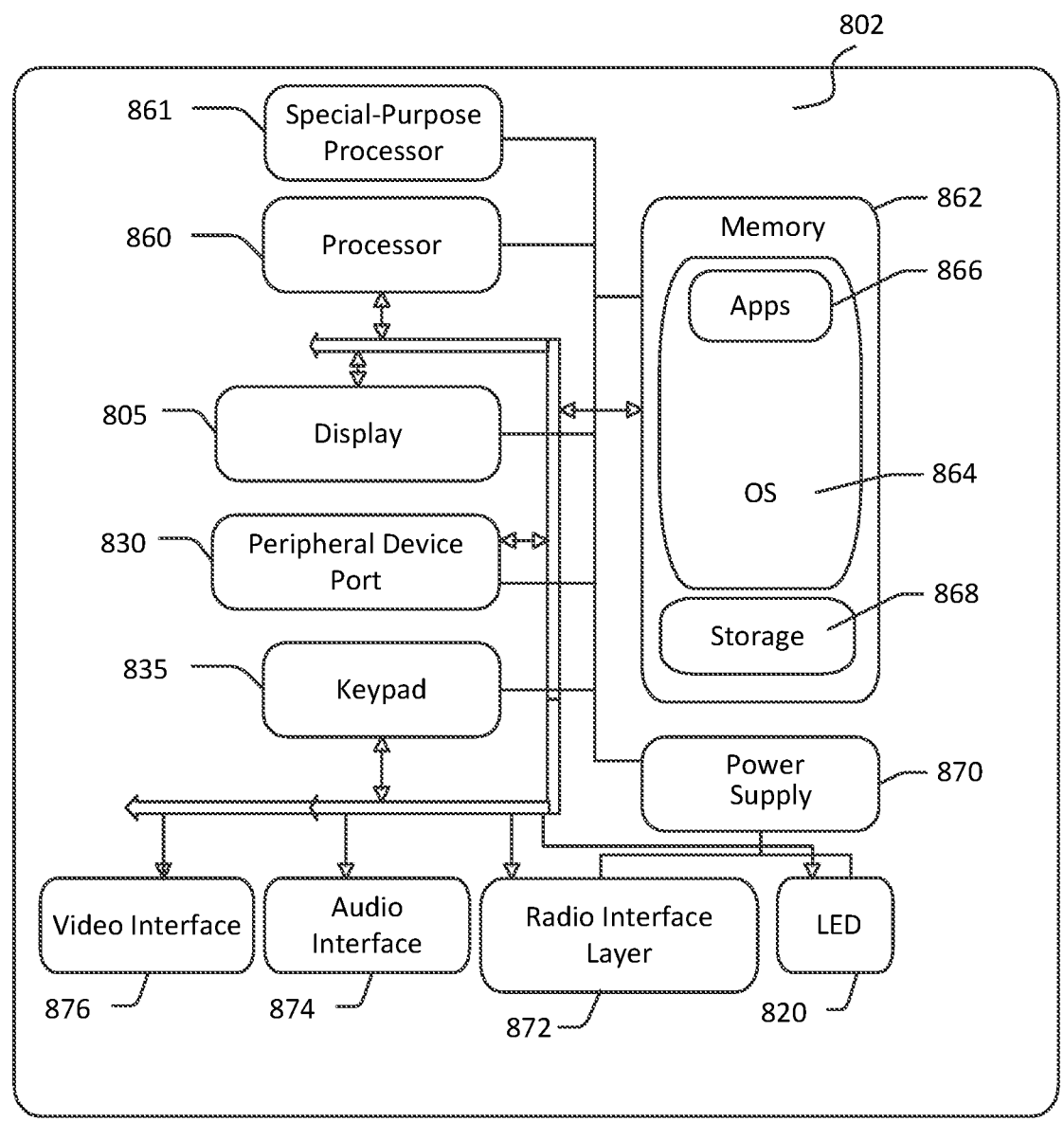

FIGS. 8A and 8B illustrate a mobile computing device 800, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of a mobile computing device. That is, the mobile computing device 800 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein (e.g., search engine, extractor module, relevancy ranking module, answer scoring module, etc.).

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated embodiment, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

Figure 9:
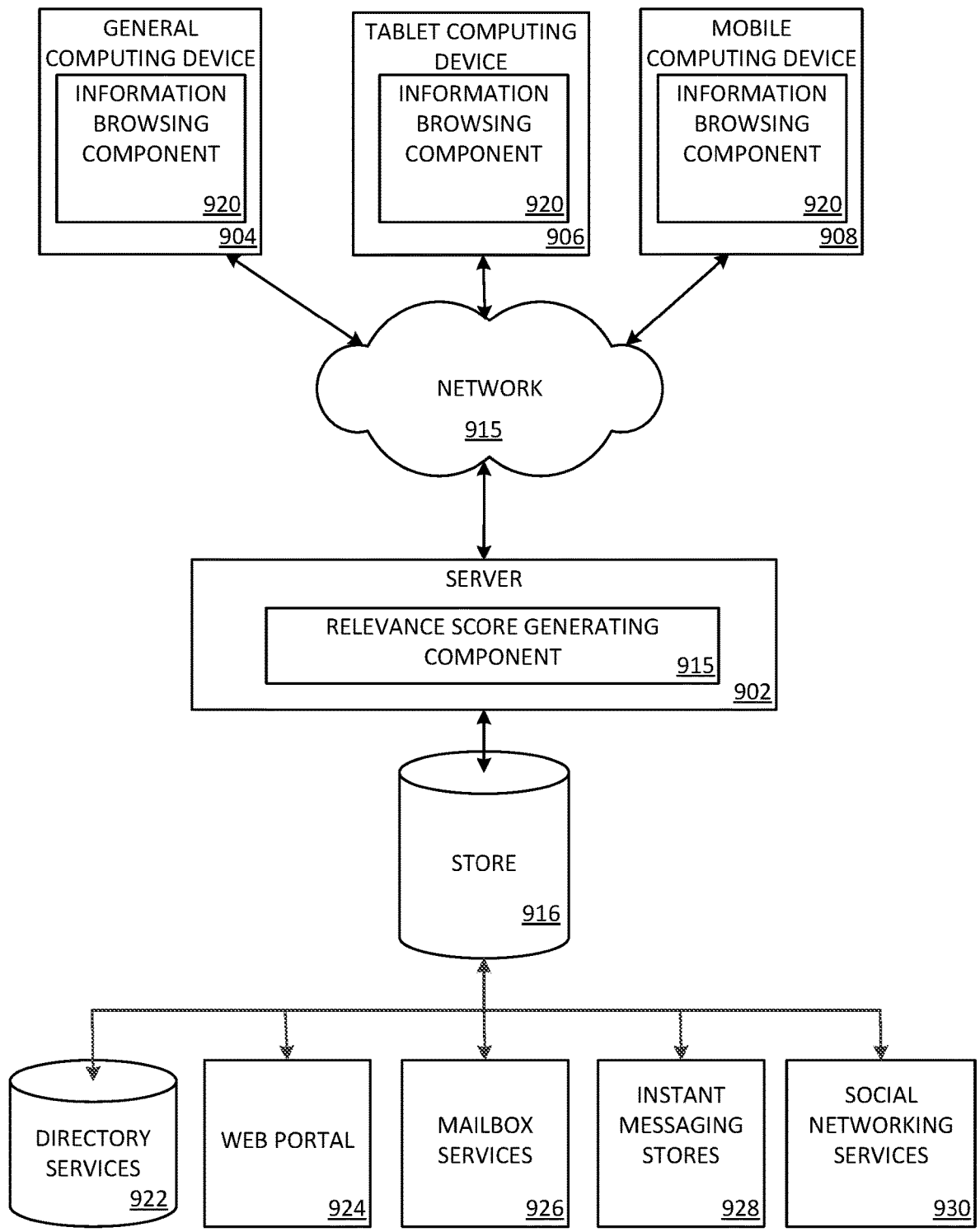
FIG. 9 is a simplified block diagram of a distributed computing system in which aspects of the present disclosure may be practiced.

FIG. 9 illustrates one aspect of the architecture of a system for processing data received at a computing system from a remote source, such as a personal computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. Information browsing component 920 may be employed by a client that communicates with server device 902, and/or a relevance score generation component 915 may be employed by server device 902. The server device 902 may provide data to and from a client computing device such as a personal computer 904, a tablet computing device 906 and/or a mobile computing device 908 (e.g., a smart phone) through a network 915. By way of example, the computer system described above may be embodied in a personal computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Figure 10:
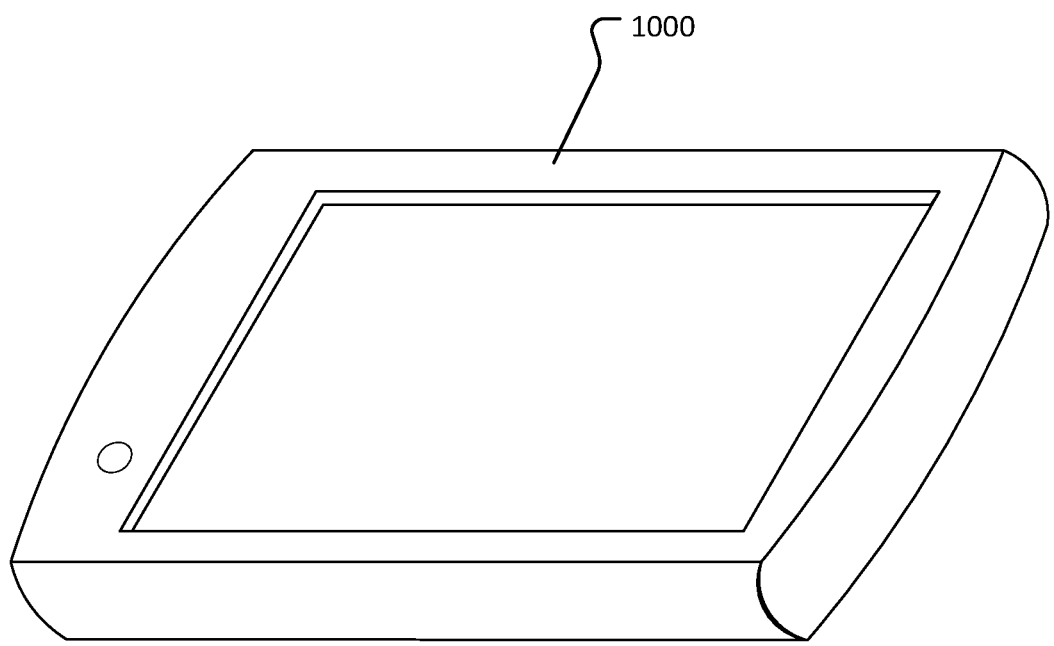
FIG. 10 illustrates a tablet computing device for executing one or more aspects of the present disclosure.

FIG. 10 illustrates an exemplary tablet computing device 1000 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
    at least one processor; and
    a memory encoding computer executable instructions that, when executed by the at least one processor, perform a method for generating relevance scores on words of a natural language answer passage, the method comprising:
        obtaining a natural language query submitted by a user and a natural language passage in response to the natural language query;
        generating a first encoded set of multi-dimensional semantic vectors based on the natural language query using a first encoder, wherein at least one dimension of a plurality of dimensions of the multi-dimensional semantic vectors is associated with semantics of the natural language query;
        generating a second encoded set of multi-dimensional semantic vectors based on the natural language passage using a second encoder;
        generating a set of multi-dimensional textual vectors for words of the natural language passage, wherein at least one dimension of a plurality of dimensions of the multi-dimensional textual vectors is associated with a word in the natural language passage, representing word-by-word textual characteristics of the natural language passage;

generating an augmented set of multi-dimensional semantic vectors based on the first and the second encoded sets of multi-dimensional semantic vectors using an augmenter, wherein the augmented set of multi-dimensional semantic vectors represent collective semantics of a combination of the natural language query and the natural language passage;

generating, using a decoder, a relevance score associated with the word of the natural language passage based on a combination including the set of multi-dimensional textual vectors and the augmented set of multi-dimensional semantic vectors; and in accordance with the generated relevance score associated with the word in the natural language passage, identifying at least the word of the natural language passage for highlighting to the user.

2. The system of claim 1, wherein, the first encoder is a query encoder comprising a first recurring neural network with first long short-term memory systems, and wherein, the second encoder is an answer passage encoder comprising a first recurring neural network with second long short-term memory systems.

3. The system of claim 1, wherein, the decoder comprises a recurring network with long short-term memory systems, and wherein, the decoder comprises a softmax processor, and wherein the softmax processor converts a value of probability into a score using at least one threshold value.

4. The system of claim 1, wherein, the relevance score comprises one of at least two levels of relevance.

5. The system of claim 1, the method further comprising:
highlighting one or more words of the natural language passage based at least in part upon the relevance score; and
providing the highlighted one or more words.

6. The system of claim 1, wherein the first and the second encoded set of multi-dimensional semantic vectors and the set of multi-dimensional textual vectors are at least based upon a common set of conversion mapping parameters.

7. The system of claim 2, wherein the first long short-term memory system and the second long short-term memory system are at least based upon to a common set of weight parameters.

8. A computer-implemented method, the method comprising:
obtaining a natural language query submitted by a user and a natural language passage responsive to the natural language query;
generating a first encoded set of multi-dimensional semantic vectors based on the natural language query using a first encoder, wherein at least one dimension of a plurality of dimensions of the multi-dimensional semantic vectors is associated with semantics of the natural language query;
generating a second encoded set of multi-dimensional semantic vectors based on the natural language passage using a second encoder;
generating a set of multi-dimensional textual vectors for words of the natural language passage, wherein at least one dimension of a plurality of dimensions of the multi-dimensional textual vectors is associated with a word in the natural language passage, representing word-by-word textual characteristics of the natural language passage;
generating an augmented set of multi-dimensional semantic vectors based on the first and the second encoded sets of multi-dimensional semantic vectors using an augmenter, wherein the augmented set of multi-dimensional semantic vectors represent collective semantics of a combination of the natural language query and the natural language passage;

generating, using a decoder, a relevance score associated with the word of the natural language passage based on a combination including the set of multi-dimensional textual vectors and the augmented set of multi-dimensional semantic vectors; and in accordance with the generated relevance score associated with the word in the natural language passage, identifying at least the word of the natural language passage for highlighting to the user.

9. The computer-implemented method of claim 8, wherein, the first encoder is a query encoder comprising a first recurring neural network with first long short-term memory systems, and wherein, the second encoder is an answer passage encoder comprising a first recurring neural network with second long short-term memory systems.

10. The computer-implemented method of claim 8, wherein, the decoder comprises a recurring network with long short-term memory systems, and wherein, the decoder comprises a softmax processor, and wherein the softmax processor converts a value of probability into a score using at least one threshold value.

11. The computer-implemented method of claim 8, wherein, the relevance score comprises one of at least two levels of relevance.

12. The computer-implemented method of claim 8, the method further comprising:
highlighting one or more words of the natural language passage based at least in part upon the relevance score; and
providing the one or more highlighted words.

13. The computer-implemented method of claim 8, wherein the first and the second encoded set of multi-dimensional semantic vectors and the set of multi-dimensional textual vectors are based on a common set of conversion mapping parameters.

14. The computer-implemented method of claim 9, wherein the first long short-term memory system and the second long short-term memory system refer to a common set of weight parameters.

15. A computer storage media containing computer executable instructions which, when executed by a computer, perform a method, the method comprising:
obtaining a natural language query submitted by a user and a natural language passage responsive to the natural language query;
generating a first encoded set of multi-dimensional semantic vectors based on the natural language query using a first encoder, wherein at least one dimension of a plurality of dimensions of the multi-dimensional semantic vectors is associated with semantics of the natural language query;
generating a second encoded set of multi-dimensional semantic vectors based on the natural language passage using a second encoder;
generating a set of multi-dimensional textual vectors for words of the natural language passage, wherein at least one dimension of a plurality of dimensions of the multi-dimensional textual vectors is associated with a word in the natural language passage, representing word-by-word textual characteristics of the natural language passage;
generating an augmented set of multi-dimensional semantic vectors based on the first and the second encoded sets of multi-dimensional semantic vectors using an augmenter, wherein the augmented set of multi-dimensional semantic vectors represent collective semantics of a combination of the natural language query and the natural language passage;

generating, using a decoder, a relevance score associated with the word of the natural language passage based on a combination including the transcoded set of multi-dimensional textual vectors and the augmented set of multi-dimensional semantic vectors; and in accordance with the generated relevance score associated with the word in the natural language passage, identifying at least the word of the natural language passage for highlighting to the user.

16. The computer storage media of claim 15, wherein, the first encoder is a query encoder comprising a first recurring neural network with first long short-term memory systems, and wherein, the second encoder is an answer passage encoder comprising a first recurring neural network with second long short-term memory systems.

17. The computer storage media of claim 15, wherein, the decoder comprises a recurring network with long short-term memory systems, and wherein, the decoder comprises a softmax processor, and wherein the softmax processor converts a value of probability into a score using at least one threshold value.

18. The computer storage media of claim 15, wherein, the relevance score comprises one of at least two levels of relevance.

19. The computer storage media of claim 15, the method further comprising:

highlighting one or more words of the natural language passage based at least in part upon the relevance score; and providing the one or more highlighted words.

20. The computer storage media of claim 15, wherein the first long short-term memory system and the second long short-term memory system refer to a common set of weight parameters.

* * * * *